United States Patent [19]

Arcuri et al.

[11] Patent Number: 4,530,783

[45] Date of Patent: Jul. 23, 1985

[54] COMPOSITION OF MATTER SUITABLE FOR SOLIDIFYING RADIOACTIVE WASTES, PRODUCTS BASED ON SAID COMPOSITION WHEREIN RADIOACTIVE WASTES ARE SOLIDIFIED AND PROCESS FOR OBTAINING SAID PRODUCTS

[75] Inventors: Luigi Arcuri, Bracciano; Elvio Bertotti, Colleferro; Giancarlo Carignani, Rome; Aldo Cipriani, Colleferro; Aldo Donato; Giuseppe Grossi, both of Rome, all of Italy

[73] Assignees: Snial Resine Poliestere S.p.A., Frosinone; Comitoto Nazionale Per L'Energia Nucleare, Marghenta, both of Italy

[21] Appl. No.: 356,344

[22] Filed: Mar. 9, 1982

[30] Foreign Application Priority Data

Mar. 9, 1981 [IT]  Italy ................................. 20224 A/81

[51] Int. Cl.³ .............................................. G21F 9/16
[52] U.S. Cl. ...................................... 252/628; 523/502
[58] Field of Search ......................... 252/628; 523/502

[56] References Cited

U.S. PATENT DOCUMENTS

| 3,629,169 | 12/1971 | Bedighian | 523/502 |
| 4,077,901 | 3/1978 | Arnold et al. | 252/628 |
| 4,077,931 | 3/1978 | Leitheiser et al. | 523/502 |
| 4,256,625 | 3/1981 | Dachs | 524/604 |

FOREIGN PATENT DOCUMENTS 793468  4/1958  United Kingdom ................ 523/502

*Primary Examiner*—Deborah L. Kyle

[57] ABSTRACT

A composition of matter suitable for solidifying radioactive wastes is formed of unsaturated polyester resins comprising a polyester (I) obtained polycondensing (a) maleic anhydride and/or maleic and/or fumaric acid, (b) isophthalic and/or terephthalic acid, (c) neopentylglycol, (d) optionally one or more conventional glycols, wherein the amount of (c) is at least 50% by moles with respect to (c)+(d); another polyester (II) obtained polycondensing (a) maleic anhydride and/or maleic and/or fumaric acid, (b) isopropylidene-bis-(phenylene-oxypropanol-2), (c) optionally one or more conventional glycols, wherein the amount of (b) is at least 50% by moles with respect to (b)+(c); an ethylenically unsaturated monomer (III) capable of copolymerizing with (I) and (II); inhibitors, initiators, accelerators, glass fibers and other conventional additives and fillers the weight ratio of component (I) to (II) being from 100:0 to 20:80.

5 Claims, No Drawings

COMPOSITION OF MATTER SUITABLE FOR SOLIDIFYING RADIOACTIVE WASTES, PRODUCTS BASED ON SAID COMPOSITION WHEREIN RADIOACTIVE WASTES ARE SOLIDIFIED AND PROCESS FOR OBTAINING SAID PRODUCTS

BACKGROUND OF THE INVENTION

1. Field of the Invention

The present invention refers to a composition of matter based on particular unsaturated polyester resins, particularly suitable for solidifying liquid or solid low or medium level radioactive wastes.

The present invention further refers to articles obtained by cross-linking aqueous emulsions comprising said composition of matter and radioactive material.

Said solid articles are characterized by their stability to radiation and chemical agents for highly prolonged periods of time, by low susceptibility to leaching if immersed in water or in aqueous solutions, and by high mechanical resistance, in particular impact and compression resistance, whereby said articles may be transported and stored without danger that the radioactive substances therein contained may be released therefrom, even in case of accidents or natural calamities.

The present invention further refers to a process suitable for obtaining the articles based on the aforesaid composition of matter.

2. Prior Art

Processes for solidifying said low and medium level radioactive wastes in the form of solid articles are known, which articles are obtained by immobilizing said radioactive wastes in concrete, cement or in particular in resins or bitumen.

The articles obtained by said methods, however, have considerable drawbacks. Thus, for instance, the solidification by concrete or cement which is obtained from the suspension of cement and radioactive solutions and successive hardening, cannot be carried out in the case that the radioactive wastes contain particular chemical substances which act as retardants or inhibitors in the hardening phase, as for instance borates. Further in the presence of other chemicals such as for example the sulphates, the quality of the articles obtained is not satisfactory. Another drawback is due to the fact that the pieces in concrete or cement thus obtained are not sufficiently resistant to leaching of the radionuclides contained therein. This occurs because, as well known, concrete and cement normally have highly porous structure through which water, which has accidentally come into contact with such a piece, may penetrate into the piece, whereby a part of the radioactivity is leached therefrom. Finally, the solidification by concrete or cement does not permit significantly to reduce the volume of the residues to be treated, in as much as, in majority of the cases, it is not possible to solidify by concrete or cement more than 20%–30% of the radioactive waste with respect to the volume of the final product.

The use of urea-formaldehyde resin emulsions and radioactive wastes, chemically hardened, has also been proposed. Said process, while it does not permit to overcome the aforementioned problem of the leaching of radioactivity, has, further, the drawback that a piece thus obtained has low mechanical resistance, so that there is a danger that product may become cracked in the case of mechanical accidents, for example during the transport and storage operations. As to the process of solidification by bitumen, in spite of the fact that it offers better results with reference to the resistance to leaching, cost problems are associated thereto, since the solidification must be carried out at a temperature above 150° C. in expensive mixing apparatus. Furthermore, safety problems, especially in the case of the treatment of solutions containing nitrates, may occur which may give rise to bitumen oxidation, which sometimes involves explosive reactions. Finally, the mechanical characteristics of the product obtained by solidification in bitumen are not wholly satisfactory, and considerably deteriorate as the storage temperature increases. In view of the solution of said problems, the art has directed its attention to the use of unsaturated polyester or epoxy resins for the solidification of low and medium level radioactive wastes in the form of solid articles, as described in French Patent Application No. 7425298, and in the form of emulsions in polyester resins of the "water in oil" type, as described by Subramanian and others and as reported in U.S. Pat. No. 4,077,901. In every case, however, it has been noted that insufficient attention has been devoted to the correct choice of an unsaturated polyester resin which should yield optimum result as concerns the most significant characteristics which solid articles incorporating radioactive substances must present.

The literature nearly always discloses for this purpose conventional polyester resins based on phthalic anhydride, maleic anhydride and glycols, and in some cases vinyl ester type resins are proposed. No particular effort has been devoted to discover resins suitable to the purpose of obtaining the optimum characteristics required to the solid articles nor resins more suitable to the preparation of emulsions of an unsaturated polyester resin and a radioactive solution or suspension. It is known that unsaturated polyester resins may in general be emulsified with water in the presence of suitable surface active agents or electrolytes dissolved in the water itself or even without their help. In suitable conditions emulsions may be formed both of the "water in oil" type and of the "oil in water" type. The preparation of resin/water emulsions is well known to persons skilled in the art, as described for instance in U.S. Pat. Nos. 3,442,882 and 3,792,006.

The unsaturated polyester resins heretofore proposed for the purpose of solidifying solid or aqueous low and medium level radioactive wastes, have been proved not to be suitable, both as concerns the characteristics required from the solid articles obtained therefrom and the emulsifying of the radioactive wastes in the resins themselves.

SUMMARY OF THE INVENTION

It has now been surprisingly found, and this is one of the objects of the present invention, that compositions of matter based on a particular polyester resin comprising an unsaturated polyester (I) alone or admixed with a different unsaturated polyester (II) in specified composition ratios, not only satisfied the requirements of an easy emulsifying with the aforesaid radioactive wastes, but also present optimum characteristics of the solid articles obtained after hardening said emulsions. An aspect of the present invention is therefore particular compositions of matter suitable for solidifying radioactive wastes, said compositions being formed by unsaturated polyester resins comprising: an unsaturated polyester (I) obtained by polycondensation of:

(a) maleic anhydride and/or maleic acid and/or fumaric acid;
(b) isophthalic acid and/or terephthalic acid;
(c) neopentyl glycol;
(d) optionally one or more conventional glycols, such as e.g. ethylene glycol, 1,2-propylene glycol, component (c) of said unsaturated polyester (I) being present in an amount of at least 50% by mols with respect to the total of components (c)+(d);

an unsaturated polyester (II) obtained by polycondensation of:

(a) maleic anhydride and/or maleic acid and/or fumaric acid;
(b) isopropylidene-bis-(phenyleneoxy-propanol-2);
(c) optionally one or more convention glycols, such as for example ethylene glycol, 1,2-propylene glycol, neopentyl glycol, component (b) of said unsaturated polyester (II) being present in an amount of at least 50% by mols with respect to the total of the components (b)+(c);

an ethylenically unsaturated liquid monomer (III) capable of becoming copolymerized with unsaturated polyesters (I) and (II), chosen from among styrene, vinyltoluene and methylmethacrilate alone or in admixtures with each other; polymerization initiators, accelerators, glass fibers and other conventional additives and fillers; the weight ratio of components (I) and (II) being comprised between 100:0 and 20:80, preferably between 80:20 and 40:60.

As to unsaturated polyester (I) and (II) hereinbefore specified, even if some of the components of the compositions of matter hereinbefore defined should be individually and generally known for other uses, nevertheless only the use of compositions comprising components (I) or, preferably, components (I) and (II) in the particular weight ratio hereinbefore and hereinafter specified, confers to the composition those qualities which render them particularly suitable of the purpose of the present invention. If the two unsaturated polyesters hereinbefore defined are individually used for the purposes of the present invention, the results obtained are less satisfactory than those obtained by using their combination. Surprisingly, when the two aforesaid unsaturated polyesters are employed in admixture within the ratio ranges indicated as preferential, an overall optimum of the aforesaid characteristics is achieved both in the process phase of solidifying the radioactive wastes, and as to the properties the solid articles which contain said radioactive wastes solidified therein.

The mixture of the components of the compositions of matter hereinbefore specified may occur in any technically suitable order, for instance by following the succession indicated hereinbefore or by mixing the solutions of the two individual polyesters prepared by dissolution thereof in the ethylenically unsaturated monomer. The amounts by weight of the ethylenically unsaturated monomer with respect to the total of the composition of matter is suitably chosen between 15% and 60%, preferably between 25% and 50%.

A further object of the present invention is a process for emulsifying said mixtures which form the aforesaid composition with the aforesaid radioactive wastes of an aqueous solution of suspension and hardening said emulsion under particular condition to form solid articles.

By this process all types of radioactive wastes may be solidified, except those defined as "high level wastes" residues produced in installations for the spent nuclear fuel reprocessing.

DETAILED DESCRIPTION OF THE PREFERRED EMBODIMENTS

Said radioactive wastes may be in the form of aqueous solutions and/or suspensions of solid material in water (sludges) and/or emulsions of liquid material in water, or may be solid.

In this latter case they must be previously suspended or dissolved in water. Said solutions and/or suspension and/or emulsions of radioactive material in water are then emulsified with the hereinbefore defined compositions of matter by means of a stirring system preferably constituted by mechanical stirrer or by a turbine or by a static mixer. The ratio of the composition of matter based on unsaturated polyester resins and the radioactive material to be solidified is not critical as concerns the upper limit, inasmuch as it is possible to emulsify small amounts of radioactive wastes with a strong excess of resins. It is however convenient for economical reasons to use possibly small ratios of resin to radioactive waste. The lower limit of said ratio is 40:60 by weight, preferably 50:50 by weight.

In the majority of cases no particular agents are required to facilitate the emulsifying and to stabilize the emulsion in time, unless it should be necessary to store the emulsion for long periods of time. In this last case commercial emulsifying agents are conveniently used.

The hardening of the emulsion obtained is carried out by copolymerization of the olefinic double bonds of the unsaturated polyesters and of the ethylenically unsaturated monomer by the action of polymerization initiators. For this purpose the composition of the matter based on unsaturated polyesters contains a polymerization initiator system, preferably constituted by conventional peroxide and optionally by co-initiators and/or accelerators.

Examples of peroxides which may be employed are: benzoyl peroxide, tert.butyl peroxide, methylethylketone peroxide, cyclohexanone peroxide and acetylacetone peroxide.

Examples of accelerators are: cobalt salts, N,N-dimethylaniline, N,N-diethylaniline, N,N-disubstituted polymeric amines.

During the hardening, due to the exothermicity of the copolymerization process (in the order of 80–100 cal/g) a considerable amount of heat develops which is not easily removed especially when the amount of emulsion to be hardened is considerable and in particular if the thickness of the hardened block is large.

In the case that the temperature within the emulsion should rise above 100° C. due to the evolution of reaction heat, water may become vapor, thus resulting in rupture of the emulsion and cracking or breaking up of the article to be obtained. It is therefore necessary to assure that the temperature within the emulsion should never rise above 100° C., and preferably should remain below about 90° C.

This may be obtained by suitably dosing the catalytic system and the inhibitors, according to known techniques which prolong the hardening process in time. The emulsifying and the subsequent hardening may suitably occur in 2 different vessels or they may occur in the same vessel. The vessel in which the hardening occurs may be a drum of iron or of any other material destined to contain the radioactive block to be obtained, both during transport and during storage. A convenient solution may consist in using a drum made of resin reinforced with glass fibers; in this way the drum and the hardened block to be contained therein will form a single body after the polymerization of the emulsion.

It is preferable to employ a composition of matter which contains fibers so as to increase the mechanical resistance of the radioactive block obtained. To this purpose, cut glass fibers, called "chopped-strand" are conveniently used. The solid blocks containing the material in the form of occluded aqueous particles may embody up to 60% by weight of radioactive aqueous solutions or suspension with respect to the total weight of the piece. Said solid blocks obtained by the process according to the present invention are particularly suitable for transportation and storage of the radioactive waste thanks to a series of particular characteristics:

(1) high resistance to leaching of the incorporated radioisotopes.

A solid piece containing aqueous solutions and/or emulsions and/or dispersions, in the form of small particles blocked therein, according to what is described in the present invention, must lose only minimum amounts by weight of the radioactive and non-radioactive ions contained therein, when it is leached with deionized water for 72 hours at 99° C. according to SOXHLET LEACH TEST PROCEDURE "for testing of Solidified Radioactive Waste", and when it is leached with deionized water for 300 days at 23° C. according to the method described in Example 20.

(2) High compression strength.

The compression strength is higher than 50 kg/cm$^2$ and may reach values above 170 kg/cm$^2$ (measured according to the norm ASTM D 695).

(3) High impact resistance.

(4) Radiation resistance. A block of solid material as hereinbefore defined, when irradiated by a Co source at the radiation dose of about $2.10^5$ rad/hours for a total absorbed dose of $5.6.10^8$ Rads, undergoes a loss of weight in the order of 0.1% approximately or less, of the initial weight of the sample and does not show substantial alterations of its mechanical characteristics.

In order to further reduce a possible leaching of water-soluble ions of the radioactive material of the solid block, it is convenient to add to the water/radioactive material system, before emulsifying it with the hereinbefore defined compositions of matter, a substance which is capable of sequestring the water-soluble radioactive ions present, in the form of slightly soluble complexes.

The invention is illustrated by the following examples, which have no limitative function.

The parts (indicated by the symbol "p") are to be understood as parts by weight, unless otherwise specified.

EXAMPLE 1

A simulated, non-radioactive solution (A) is prepared, having the following composition:
NaNO$_3$: 357p
HNO$_3$: 126p
Fe$_2$(SO$_4$)$_3$: 60p
H$_2$SO$_4$ concentrated: 44p
H$_2$O to make: 1000p Separately there are synthetized, by using normal esterification methods: an unsaturated polyester of the type (II) by reacting 3440p of isopropylidene-bis-(p-phenyleneoxy-propanol-2) and 1160p of fumaric acid until an acid number of 15-20 has been reached and by dissolving the polymeric ester thus obtained in styrene in the ratio 60:40 approximately, adding hydroquinone as stabilizer in the concentration of 0.015 g %. A composition (B) is thus obtained.

Another type (I) unsaturated polyester is obtained by reacting 1300p of neopentyl glycol, 340p of diethylene glycol, 735p of maleic anhydride, 1245p of isophthalic acid, until an average molecular weight above 1200 is attained. This unsaturated polymeric ester is mixed with styrene so as to obtain a solution containing about 40% of monomer. Said solution is stabilized with 0.014% of hydroquinone. A composition (C) is thus obtained. In order to prepare the emulsion which is an object of the present invention, 500p of composition (B) and 500p of the composition (C), are mixed in a vessel having a capacity of 2500 ml. 6p of commercial benzoyl peroxide, in the form of paste, in dibutyl phthalate containing 50% of peroxide are added to said mixture. 670p of solution (A) are added under stirring and at a controlled speed so as to complete the operation in 15 min.

The formation of the emulsion occurs rapidly. Once the solution has been completely added, the mass is stirred for a further few minutes, whereafter 2p of N,N-dimethylamino-p-toluidine are slowly added. The stirring is continued for 2 more minutes to promote dissolution of the reagents. The stirrer is then removed and the organic material is allowed to polymerize, thus incorporating the sample solution. A solid block free from exudation and cracks is obtained.

EXAMPLE 2

A simulated non-radioactive solution (D) is prepared, having the following composition
LiNO$_3$: 0.75p
Na$_2$CO$_3$: 33.7p
NaNO$_3$: 2.33p
(NH$_4$)$_2$CO$_3$: 1.50p
H$_3$BO$_3$: 136p
NaBO$_2$ hydrate: 100p
H$_2$O to make: 1000p The solution is to be maintained at a temperature in the order of 40°–50°· C. to avoid precipitation of the boric acid. 1000p of a mixture of the compositions (B) and (C) obtained according to the indications of example 1, in the ratio 30/70, are separately prepared in a vessel having a capacity of 2500 ml, and 5p of 50% benzoyl peroxide paste in dibutyl phthalate are added, and stirring is started. As soon as the benzoyl peroxide has been dissolved, the addition of 670p of solution (D) is initiated, while maintaining it warm as stated hereinbefore. The emulsion is formed rapidly even under mild stirring. Once the addition of the solution has ended, 1p of N,N-dimethylamino-p-toluidine is added and the stirring is continued for some further minutes. The stirrer is removed and the emulsion is allowed to stay. The polyester polymerizes rapidly: a solid block, having a dry surface and free from cracks is thus obtained.

EXAMPLE 3

An emulsion prepared as described in example 1 is cast, before it polymerizes, into glass tubes having an inner diameter of 20 mm. It is allowed to polymerize. From the solid thus obtained cylinders 20 mm high are cut, which are subjected to a rapid leaching test in a Soxhlet apparatus at 99° C. (according to SOXHLET LEACH TEST PROCEDURE" for testing of "Solidified Radioactive Waste"). In order to quantify the resistance to leaching, the release of sodium is considered, as a measure of the "speed of leaching", the value of which in the present case is found to be $1.0 \cdot 10^{-2}$ g cm$^{-2}$ days$^{-1}$ (expressed in units g cm$^{-2}$ days$^{-1}$ in order to be homogeneous with the data that are found in the literature). Said speed is calculated by the following formula $$R_{Si} = \frac{a}{A_o} \frac{W_1}{S \cdot t}$$

wherein:
$R_{Si}$ = Soxhlet leaching speed based on leached ions (g cm$^{-2}$ days$^{-1}$)
a = quantity of ions in solutions (g)
$A_o$ = Na$^+$ ions in the sample (g)
$W_1$ = initial weight of the test specimen.
S = surface (cm$^2$)
t = time (days)
Further it is found that the amount of Na$^+$ ions extracted from the test specimen is lower than 10% after 72 hours.

EXAMPLE 4

An emulsion prepared as described in example 2 is cast, before it polymerizes, into glass tubes having an inner diameter of 20 mm. It is allowed to polymerize. 20 mm high cylinders are cut from the solid thus produced, which cylinders are subjected to a leaching test as described in example 3. The values of the leaching speed are in the order of $1.5 \cdot 10^{-2}$ g cm$^{-2}$ days$^{-1}$. The amount by weight of Na$^+$ ion leached from the test specimen is in the order of 14% after 72 hours.

EXAMPLE 5

An emulsion is prepared as in example 1, but with a ratio of composition (B) to composition (C) of 30 parts to 70 parts. Test specimen prepared as in the example 3, subjected to leaching, yield a value of leaching speed of $1.6 \cdot 10^{-2}$ g cm$^{-2}$ days, and a percentage of Na$^+$ ion leached in of the order of 16% after 72 hours.

EXAMPLE 6

An emulsion is prepared as in the example 1, it is cast into glass tubes having an inner diameter of 25 mm and cylinders are cut as described in the example 3 but having dimensions of 25 mm diameter and 50 mm height. Resistance to compression tests are carried out on said cylinders using an Instron 10 KN electronic dynamometer, according to norm ASTM D 695. The values obtained for the compression strength are in the order of 120 kg/cm$^2$, measured at 10% of deformation, at which point the test specimen has not broken. The value of the elasticity modulus at compression measured simultaneously is in the order of 4500 kg/cm$^2$.

EXAMPLES 7-17

The following examples illustrate the importance of the variation of the content of each of two unsaturated polyesters (I) and (II) in the mixture on the speed of leaching determined by the method described in example 1, the type and concentration of emulsified solution being the same in all of the following examples, and being that described in example 1. A series of emulsions is prepared, wherein the composition of the mixtures varies as described in the following table, and wherein the ratio 1:1 is always maintained between the organic phase (immobilizing matrix) and the aqueous phase (radioactive waste, as dispersed phase). The emulsions are prepared as described in example 1. The test specimens are prepared and subjected to leaching as described in example 3. The results obtained are listed in the following table. Example 7 and 8 are comparison examples.

TABLE

| Example | Mixture ratio Polyester type (I) | Mixture ratio Polyester type (II) | leaching speed g cm$^{-2}$ · days$^{-1}$ |
|---|---|---|---|
| 7 | 0 | 100 | unmeasurable: corroded sample |
| 8 | 10 | 90 | as above |
| 9 | 20 | 80 | $80 \cdot 10^{-2}$ |
| 10 | 30 | 70 | $50 \cdot 10^{-2}$ |
| 11 | 40 | 60 | $35 \cdot 10^{-2}$ |
| 12 | 50 | 50 | $8.1 \cdot 10^{-2}$ |
| 13 | 60 | 40 | $2 \cdot 10^{-2}$ |
| 14 | 70 | 30 | $1.2 \cdot 10^{-2}$ |
| 15 | 80 | 20 | $2.8 \cdot 10^{-2}$ |
| 16 | 95 | 5 | $15.0 \cdot 10^{-2}$ |
| 17 | 100 | 0 | $25 \cdot 10^{-2}$ |

EXAMPLE 18

An emulsion is prepared as described in example 2 and test specimens are prepared therefrom as described in example 6. Said specimens, subjected to compression test according to norm ASTM D 695, evidence a compression strength of 95 kg/cm$^2$ measured at 10% of deformation, at which point the test specimen has not broken. Simultaneously the elasticity modulus at compression is measured and has a value of about 4200 kg/cm$^2$.

EXAMPLE 19

A simulated non-radioactive solution (E) is prepared having the following composition:
Na$_3$PO$_4$: 30p
FeCl$_3$: 15p
CaCl$_2$: 10p
H$_2$O to make: 1000p
Separately, 1000p of mixture of resins having composition (B)+(C) prepared according to the indication of example 1, in ratio 70:30, are prepared in a vessel having a capacity of 2500 ml and 5p of 50% benzoyl peroxide paste in dibutyl phthalate are added, and the stirring is initiated.

As soon as the benzoyl peroxide has been dissolved, the addition of 818 p of solution (E) is started, always continuing the stirring. Once the addition of solution is ended, 1p of N,N-dimethyalmine-p-toluidine is added and the stirring is continued for some further minutes. The emulsion thus prepared, is cast into a glass tube having an inner diameter of 20 mm. It is allowed to polymerize. 20 mm high cylinders are cut from the solid thus obtained obtained and they are subjected to leaching test as described in the example 3. The leaching speed values are in the order of $1 \cdot 10^{-2}$ g cm$^{-2}$ days$^{-1}$. The amount by weight of Na$^+$ ion extracted from the test specimen is in the order of 10% after 72 hours.

EXAMPLE 20

An emulsion prepared as described in example 1 wherein, however, radionuclides as tracers with the following activities: Co$^{58}$ = 280 $\mu$Ci; Cs$^{137}$ = 212 $\mu$Ci Sr$^{85}$ = 593 $\mu$Ci, are added, is cast before it polymerizes into a polyethylene container having the dimensions: diameter of 50 mm and height of 55 mm. It is allowed to polymerize and a specimen having diameter of 50 mm and height 50 mm is cut. The test specimen thus obtained is subjected to a long term leach test, as specified hereinafter.

In order to quantify the leaching resistance, the release of radioisotopes is calculated with a quantity called "leaching rate" the value whereof being in the present case $1.5 \cdot 10^{-5}$ cm days$^{-1}$ for Co$^{58}$, $5.1 \cdot 10^{-5}$ cm days$^{-1}$ for Cs$^{137}$ and $4.9 \cdot 10^{-5}$ cm days$^{-1}$ for Sr$^{85}$. The method used is the following: a test specimen of the piece containing radioactive wastes solidified according to the method described in the present application, said test specimen being constituted by a block of material having a cylindrical shape, the total geometrical surface whereof being between 10 and 200 cm$^2$, is placed in a container of polytetrafluorethylene or polypropylene in such a way that the test specimen is suspended by means of wires covered with one of the aforesaid materials so as not to touch the surface of the container. The container is filled with deionized water in order to completely cover the test specimen, this latter being surrounded at each point by a layer having at least 1 cm thickness of deionized water. The dimensions of the vessel and the amount of deionized water should be chosen in such a way that the value of the ratio of the deionized water to the area of the total geometric surface of the test specimen be comprised in the range from 0.08 to 0.12 m. The container is sealed and kept for 300 days at 23° C.±1° C. in such a way that the water does not undergo any mechanical stirring. The deionized water, after a certain contact time is substituted with fresh deionized water with the following frequency: once a day for the first seven days, twice a week for the second week, once a week for the third, fourth, fifth, and sixth week and thereafter once a month for the remaining time period up to 300th day.

The individual amounts of water used are collected and the pH, the sodium ion, the Co$^{58}$, the Cs$^{137}$ and Sr$^{85}$ are determined by the usual analitical chemistry and radioactivity methods.

The results of the leach test should be expressed for each component by the leaching rate $R_n{}^i$, $$R_n{}^i = a_n{}^i / (A_o{}^i \cdot F \cdot t_n \cdot \rho),$$

wherein:

$R_n{}^i$ = leaching rate in m/s of the i-th component, during the n-th leaching period;

$a_n{}^i$ = radioactivity in s$^{-1}$ or mass in kg leached during the n-th leaching period, of the i-th component leached;

$A_o{}^i$ = specific radioactivity in s$^{-1} \cdot$kg$^{-1}$ or concentration by weight initially present in the test specimen;

F = exposed surface of the test specimen in m$^2$;

$t_n$ = time of the n-th leaching period in s;

$\rho$ = mass by unit volume of the test piece in kg/m$^3$.

$A_o{}^i$ and $a_n{}^i$ should be corrected by taking into account the decay time of the radionuclide considered.

For the most suitably solidified material the leaching rate $R_n$ becomes constant after a certain amount of continuous renewals of leaching solution, as it is seen from the diagram of the variation of $R_n$ as a function of time.

Said value, virtually constant, should be indicated together with its accuracy.

EXAMPLE 21

An emulsion prepared as described in example 19, wherein however radionuclides as tracers with following activities:

Co$^{58}$=270 μCi Cs$^{137}$=201 μCi Sr$^{85}$=490 μCi are added, is cast into a polyethylene container. The specimens prepared as described in example 20 are subjected to leach tests in the way described in example 2, whereby the following values are obtained:

Co$^{58}$=$3.1 \cdot 10^{-6}$ cm days$^{-1}$; Cs$^{137}$=$4.9 \cdot 10^{-7}$ cm days$^{-1}$; Sr$^{85}$=$7 \cdot 10^{-7}$ cm days$^{-1}$.

EXAMPLE 22

An emulsion, prepared as described in the example 2, wherein, however, radionuclides as tracers with the following activities:

Co$^{58}$=166 μCi Cs$^{137}$=210 μCi Sr$^{85}$=490 μCi are included in the solution (D), is cast into polyethylene containers. The specimens prepared as described in the example 20 are subjected to leach tests in the way described in the example 20, whereby the following values are obtained:

Co$^{58}$=$2.7 \cdot 10^{-5}$ cm days$^{-1}$; Cs$^{137}$=$2.6 \cdot 10^{-4}$ cm days$^{-1}$; Sr$^{85}$=$4.9 \cdot 10^{-6}$ cm days$^{-1}$.

We claim:

1. Composition of matter suitable for solidifying radioactive wastes, said composition being formed of unsaturated polyester resins comprising:

an unsaturated polyester (I) obtained by polycondensation of:
  (a) maleic anhydride and/or maleic acid and/or fumaric acid;
  (b) isophthalic acid and/or terephthalic acid;
  (c) neopentylglycol;
  (d) optionally one or more conventional glycols chosen from the group consisting of ethylene glycol and 1,2-propylene glycol, the component (c) of said unsaturated polyester (I) being present in an amount of at least of 50% by mols with respect to the sum of components (c)+(d);

an unsaturated polyester (II) obtained by polycondensation of:
  (a) maleic anhydride and/or maleic acid and/or fumaric acid;
  (b) isopropylidene-bis-(phenyleneoxy-propanol-2)
  (c) optionally one or more conventional glycols, chosen from the group consisting of ethylene glycol, 1,2-propylene glycol, and neopentyl glycol, component (b) of said unsaturated polyester (II) being present in an amount of at least 50% by mols, with respect to the sum of components (b)+(c);

an ethylenically unsaturated liquid monomer (III) capable of being copolymerized with the unsaturated polyesters (I) and (II), selected from the group consisting of styrene, vinyltoluene, methylmethacrylate and their mixtures; inhibitors, polymerization initiators, accelerators, glass fibers and other conventional additives and fillers; the weight ratio of the aforesaid components (I) and (II) being comprised between 80:20 and 40:60.

2. Composition of matter according to claim 1, characterized by the fact that the amount by weight of the aforesaid component (III) with respect to the total of the composition of matter is comprised between 15% and 60%.

3. Process for solidifying radioactive wastes
  (a) preparing a solution and/or suspension and/or emulsion composition of claim 1 by means of a stirring system, the ratio of said composition to the aqueous radioactive waste to be blocked being higher than 40:60 by weight (b) hardening the obtained emulsion by copolymerization of the olefinic double bonds of the resins and of the ethylenically unsaturated monomer in the presence of polymerization initiators.

4. Solid articles obtained by the process of claim 3.

5. Solid articles according to claim 4 characterized by the fact they contain the radioactive material in the form of occluded aqueous particles.

* * * * *